Dec. 29, 1936.  J. H. TAYLOR ET AL  2,065,628
VALVE CONSTRUCTION
Filed Feb. 29, 1932    4 Sheets-Sheet 2
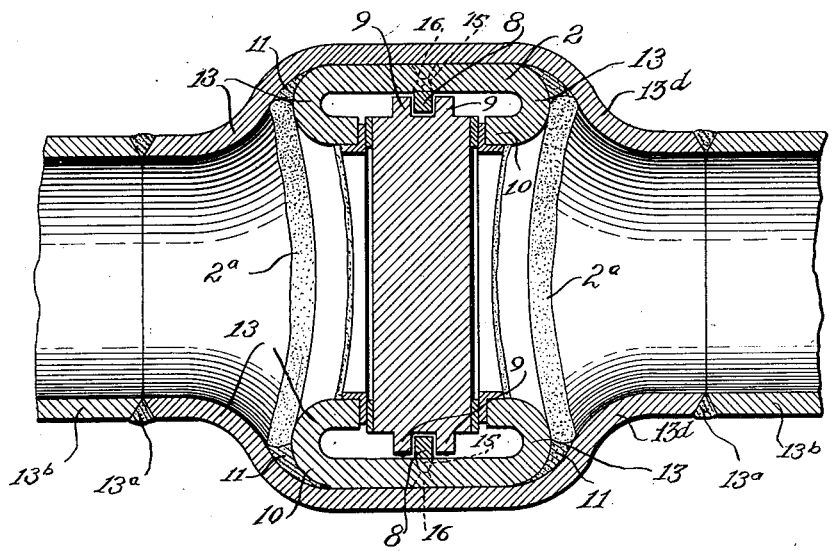
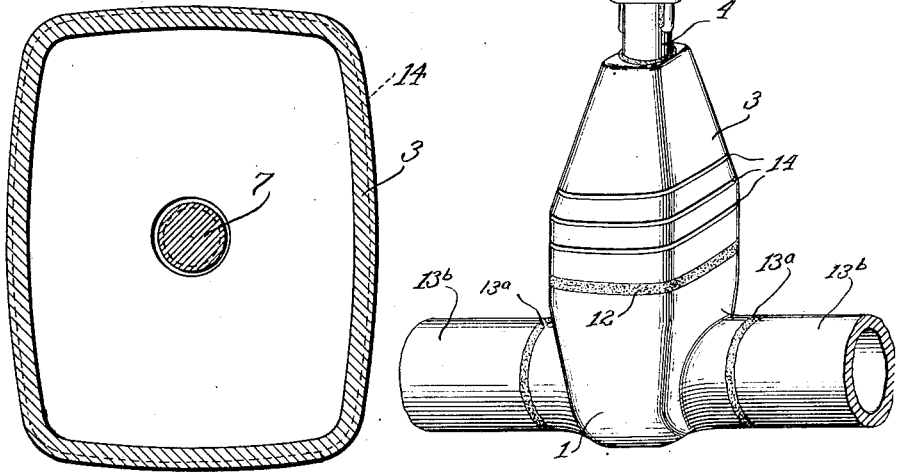
Inventors:
James Hall Taylor,
Edward Hall Taylor,
By Jones, Addington, Ames and Siebold
Attys Dec. 29, 1936.   J. H. TAYLOR ET AL   2,065,628
VALVE CONSTRUCTION
Filed Feb. 29, 1932   4 Sheets-Sheet 3
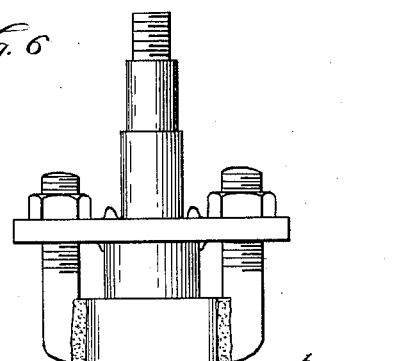
Fig. 6
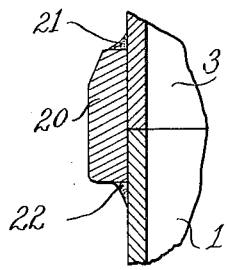
Fig. 7
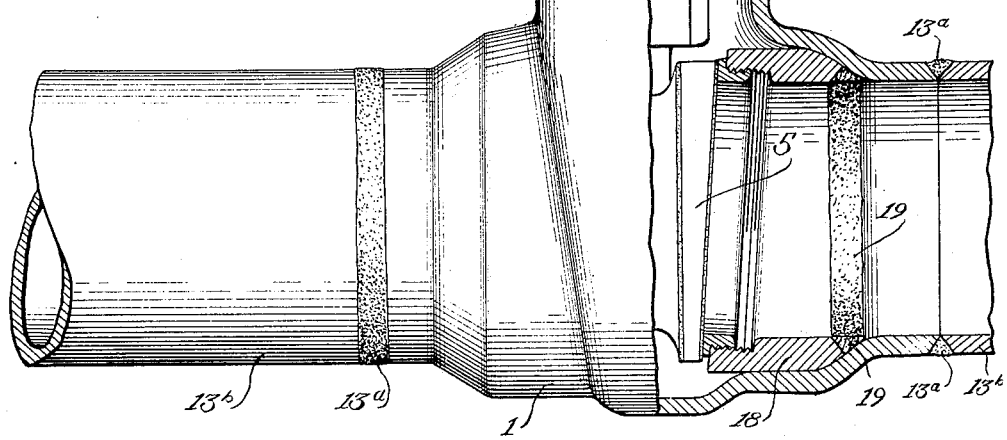
Inventors:
James Hall Taylor
Edward Hall Taylor
By Jones, Addington, Ames and Seibold
Attys.

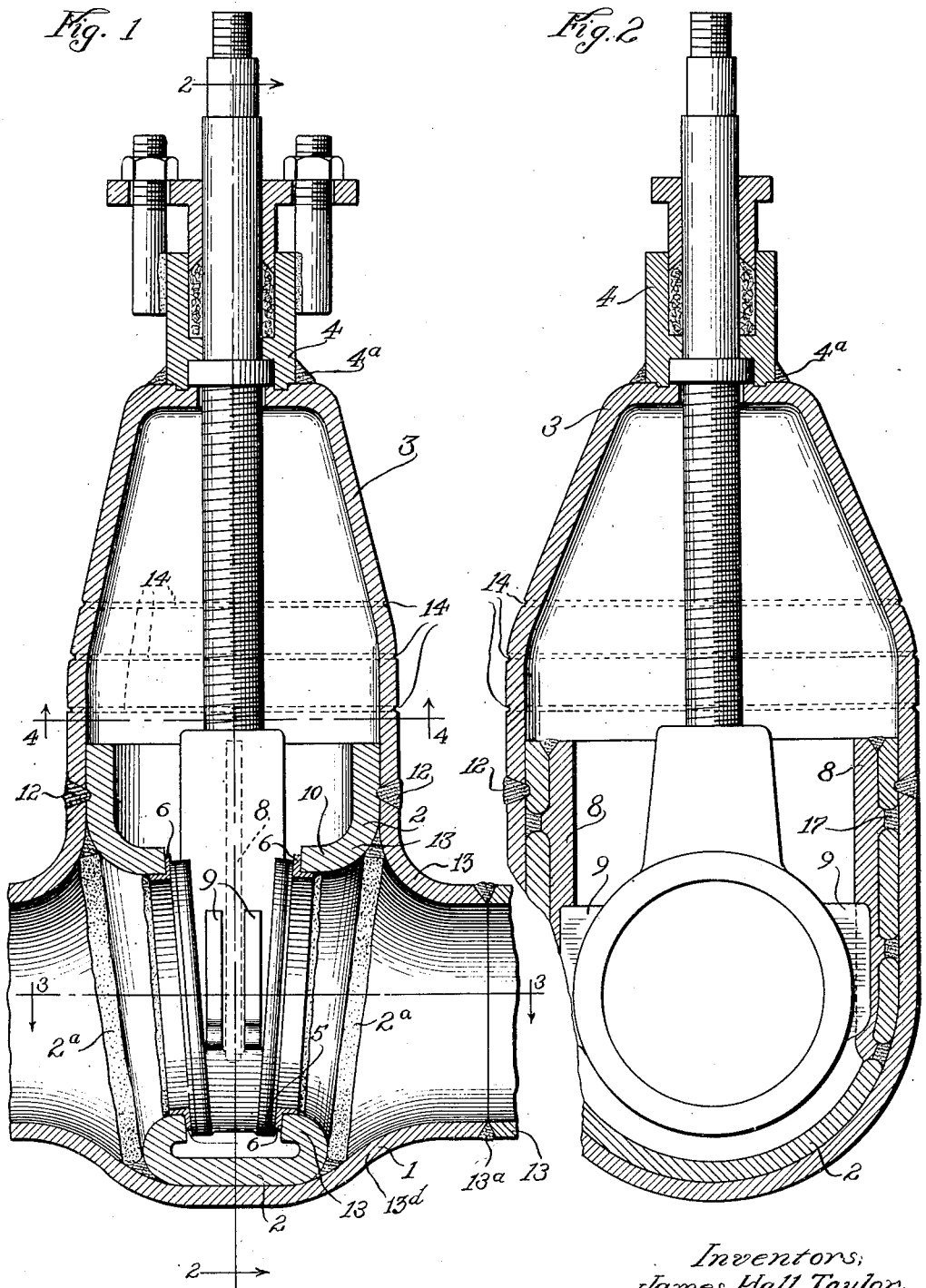

Dec. 29, 1936.  J. H. TAYLOR ET AL  2,065,628
VALVE CONSTRUCTION
Filed Feb. 29, 1932  4 Sheets-Sheet 4
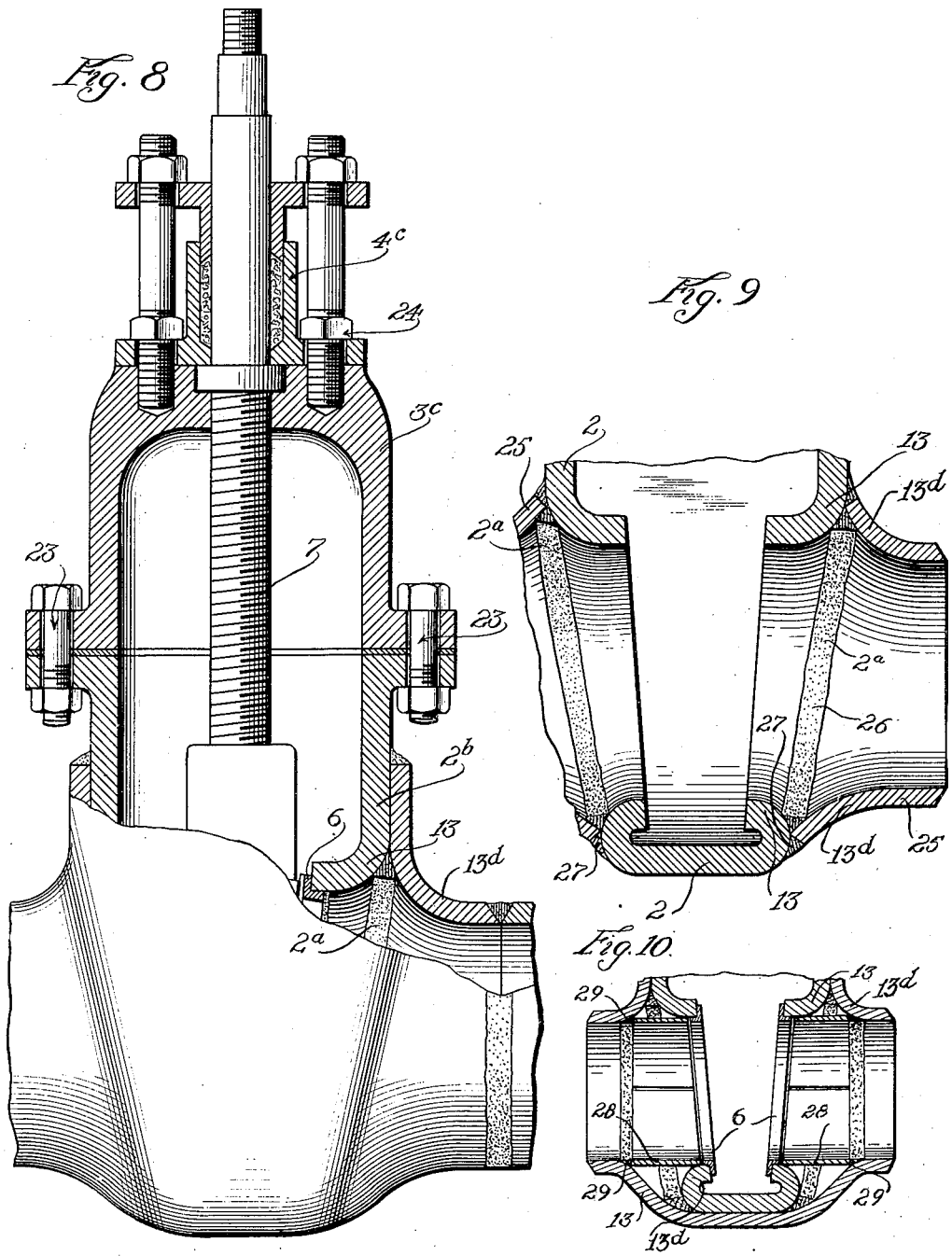
Inventors,
James Hall Taylor,
Edward Hall Taylor,
By Jones, Addington, Ames and Seubold
Atty's Patented Dec. 29, 1936

2,065,628

UNITED STATES PATENT OFFICE 2,065,628

VALVE CONSTRUCTION

James Hall Taylor and Edward Hall Taylor, Oak Park, Ill.

Application February 29, 1932, Serial No. 595,688

5 Claims. (Cl. 251—155)

Our invention relates to wrought metal welded valve constructions.

In many respects fusion welded joints in valve construction are preferable to any other kind because of the fact that no leaky joints will develop, as is likely to be the case where gasket joints and threaded joints are used, and because there are no threaded connections which may be tampered with.

However, the welding operation is likely to result in deflection of the parts adjacent the weld and in valve constructions there are certain parts, particularly the valve seats, which it is important should not be warped or distorted.

One of the objects of our invention is to provide a wrought metal valve body having inlet and outlet connections adapted for a welded connection in the pipe line.

A further object of our invention is to provide such a construction in which provision is made between the line of weld and the valve seat to absorb deflection, due to the welding, and prevent its transmission to the valve seat, thus avoiding warping of the valve seat.

A further object of our invention is to provide a wrought metal valve construction in which the bonnet is welded to the valve body so that there are no leaky joints and no bolted connections which may be tampered with.

Another object of our invention is to provide a valve of the type indicated in which the valve seats may be welded to the valve supporting member.

Another object of our invention is to provide a wrought metal valve construction in which the valve seat supporting member may be inserted through the tubular extension in the valve body, to which extension the bonnet is secured.

A further object of our invention is to provide a valve seat supporting member, a section of which is such that it will be able to withstand the heavy strain to which such a member is subject but which, nevertheless, can be produced economically and yet will prevent distortion of the valve seat.

Further objects will appear from the description and claims.

In the drawings, in which three forms of our invention are shown,

Figure 1 is an axial section of a non-rising stem gate valve;

Fig. 2 is a section on the line 2—2 of Fig. 1;

Fig. 3 is a section on the line 3—3 of Fig. 1;

Fig. 4 is a section on the line 4—4 of Fig. 1;

Fig. 5 is a perspective view of the valve;

Fig. 6 is a part-sectional, part-elevational view of a different form;

Fig. 7 is a detailed sectional view of a modified form of bonnet connection;

Fig. 8 is a part-sectional, part elevational view showing another modification;

Fig. 9 is an axial sectional view showing a modified form of pipe connection member; and Fig. 10 is an axial sectional view showing a pair of sleeves extending between the valve seats and the inlet and outlet connections, respectively.

Referring to the drawings in detail, and first to Figs. 1 to 5 inclusive, the construction shown therein comprises a tubular wrought metal valve body 1, of a general T-shape formation, a wrought metal cup-like valve seat supporting member 2 fitting snugly in the valve body and secured thereto by welding at 2a, a wrought metal bonnet 3 secured to the valve body and the valve seat supporting member by welding, a wrought metal packing gland 4 secured to the bonnet by welding at 4a, a valve disc member 5 cooperating with the valve seats 6, and a non-rising valve stem 7 for controlling the opening and closing movement of the valve disc. The valve disc member is guided in its movement by a pair of guide ribs 8 secured to the valve seat carrying member by a welding operation, the valve disc member being provided with laterally-extending guide flanges 9 which straddle the guide ribs.

The valve seats may be of any suitable material and may be secured to the valve seat supporting member by welding, as in Fig. 1, or by a screw-threaded connection, as in Fig. 6.

The valve seat supporting member 2 is in general in the form of a deep cup provided with inwardly extending annular tubular valve seat supporting extensions 10. The valve seat supporting member may be secured in the valve body by means of welding along the annular junctions between the valve seat supporting member and the valve body, as indicated at 11. The bonnet is secured to the valve body and the valve seat member is welded with respect to the upward tubular extension of the valve body and secured thereto by the annular weld indicated at 12.

It will be noted that the tubular extensions 10 are longer at the top than at the bottom, thus giving additional strength and stiffness to the upper portion of the valve seat supporting member. This additional strength at the upper portion is desirable for the purpose of reinforcing the valve supporting member 2 to take care of the strain incident to the pressure of the wedge gate valve 5 on the valve seats 6 and the strain due to making the welded connections.

It will be noted that the construction is such that tubular flaring portions 13 and 13d are provided between the annular welded connection 13a with the pipe 13b and the annular flange which supports the valve seat, which curved surfaces may yield to absorb the deflection due to making the welded connection, preventing this deflection from being transmitted to the valve seats and thus preventing warpage of the valve seat supporting surfaces. These curved surfaces form, in effect, an elastic bellows-like expansion and contraction construction, giving the desired and necessary flexibility to enable the welded connection to be made without distorting the valve seat.

The welded connections 12 between the valve seat supporting member, the valve body and the bonnet prevent any possibility of leakage at these points and make the entire construction a single homogeneous unit.

For purposes of inspection or repair, the bonnet may be cut open along the scored lines 14 by means of a cutting torch. For those fully experienced in the art of cutting and welding, this method of getting at the interior of the valve is quicker and cheaper than the method at present necessary in connection with gate valves in which the bonnet has a flanged and bolted connection with the valve body.

In order to strengthen the connection of the guide rib 8 with the valve seat supporting member and definitely position them in making the welded connection, the ribs are provided with extensions 15 which may be fitted into the openings 16 in the valve seat supporting member, the projections being then secured in the openings by a welding operation, as indicated at 17. The various welded connections may be made by the acetylene torch method or by the electric welding method.

The construction of Fig. 6 is in general similar to that just described, except that here an annular valve seat supporting member 18 is provided for each of the valve seats, which valve seat securing member may be secured to the valve body by means of a welding operation, as indicated at 19. In this form the packing gland 4b is integral with the bonnet 3b.

In Fig. 7 is shown a modification in which the bonnet 3 is secured to the valve body by means of a sleeve or collar 20 surrounding the junction of the bonnet 3 and valve body 1 and secured to the bonnet by welding, as indicated at 21 and secured to the body by welding, as indicated at 22.

The construction of Fig. 8 is substantially the same as that of Figs. 1 to 5, inclusive, except that here the bonnet 3c is secured to the valve seat supporting member 2b by means of a flange and bolted construction, indicated at 23, and that the packing gland 4c is secured to the bonnet by means of a flange and bolted construction, as indicated at 24.

The construction of Fig. 9 may be similar to that of Figs. 1 and 7 except that for the T-shaped valve body a pair of tubular pipe connection members 25 are substituted which are secured to the valve seat supporting member by fusion-welded joints, as indicated at 26 and 27.

For certain purposes, we may find it desirable to provide smooth surfaces between the valve seats 6 and the inlet and outlet connections, as shown in Fig. 10. This may be accomplished by providing a pair of tubular members 28, split longitudinally, as indicated at 29, to enable them to be slipped into place through the inlet and outlet connections, respectively. The tension in these tubular sections is such that they will spring outwardly to lie snugly against the flaring portions 13d, to which they may be welded, as indicated at 29. This construction facilitates the flow by eliminating the pockets between the valve seat supporting member 18 and the valve body 1. The ends of the tubular members 28, adjacent the valve seats, are not welded to the adjacent structure but are free to move with respect thereto so as not to interfere with the yielding action of the flaring portions 13.

The construction of Fig. 10 may be substantially the same as that of Fig. 1 except for the addition of the tubular members 28.

Further modifications will be apparent to those skilled in the art and it is desired, therefore, that the invention be limited only by the prior art and the scope of the appended claims.

Having thus described our invention, what we claim and desire to secure by Letters Patent is:

1. A gate valve construction having a flow passage therethrough and comprising a wrought metal body having tubular inlet and outlet extensions and an intermediate tubular extension for the valve movement, and a wrought metal valve seat member comprising a cup-like member having a pair of tubular portions extending inwardly toward each other and provided with valve seats, the upper portion of said cup-like member fitting snugly in the intermediate extension and having an annular welded connection therewith, and having annular welded connections at its junctions with the valve body surrounding the flow passage.

2. A gate valve construction having a flow passage therethrough and comprising a wrought metal body and having tubular inlet and outlet extensions and an intermediate tubular extension for the valve movement, a wrought metal valve seat supporting member comprising a cup-like member having a pair of tubular portions extending inwardly toward each other and provided with valve seats, the upper portion of said cup-like member fitting snugly in said intermediate extension and having an annular welded connection therewith, and having annular welded connections at its junctions with the valve body surrounding the flow passage, and a bonnet comprising a wrought metal cup-like member having its annular edge welded to the annular edge of the intermediate extension.

3. A gate valve construction having a flow passage therethrough and including a wrought metal valve seat supporting member comprising a cup-like member having a pair of tubular annular portions extending inwardly toward each other and surrounding the flow passage, a tubular pipe connection member in communication with the valve seat supporting member having a welded connection therewith, the construction between the valve seat and pipe connection having a curved outline in longitudinal axial section to prevent deflection due to the welding process from being transmitted to the valve seat, and a tubular member having a smooth inside surface bridging the space between the pipe connection and the valve seat to cover the pocket caused by said curved outline.

4. A gate valve construction having a flow passage therethrough and comprising a cup-like valve seat supporting member having opposed valve seat openings in its sides and an intermediate opening for the valve movement, and tubular inlet and outlet pipe connection means having provisions for making welded connections with adjacent pipe sections and having annular welded connections with the valve seat supporting member surrounding the flow passage, said pipe connection means having a substantial flare outwardly from the pipe connection weld to the valve seat supporting member weld to provide a yielding connection between the pipe connection weld and the valve seat supporting member to prevent deflection of that portion of the valve seat supporting member adjacent the weld due to the welding process from being transmitted to the valve seat.

5. A gate valve construction having a flow passage therethrough and comprising a cup-like valve seat supporting member having opposed valve seat openings in its sides and an intermediate opening for the valve movement, and tubular inlet and outlet pipe connection means having provisions for making welded connections with adjacent pipe sections and having annular welded connections with the valve seat supporting member surrounding the flow passage, said pipe connection means having a substantial flare outwardly from the pipe connection weld to the valve seat supporting member weld to provide a yielding connection between the pipe connection weld and the valve seat supporting member to prevent deflection of that portion of the valve seat supporting member adjacent the weld due to the welding process from being transmitted to the valve seat, said cup-like valve seat supporting member having a pair of tubular valve seat supporting portions extending toward each other and flaring outwardly in a substantial manner from the valve seats to the pipe connection welds to provide additional yielding.

JAMES HALL TAYLOR.
EDWARD HALL TAYLOR.